Feb. 23, 1965 S. H. KOHLER ETAL 3,170,496
POWER-OPERATED RECIPROCATING TOOL WITH INTEGRAL BEARING BLOCK
Filed Oct. 2, 1962 3 Sheets-Sheet 1
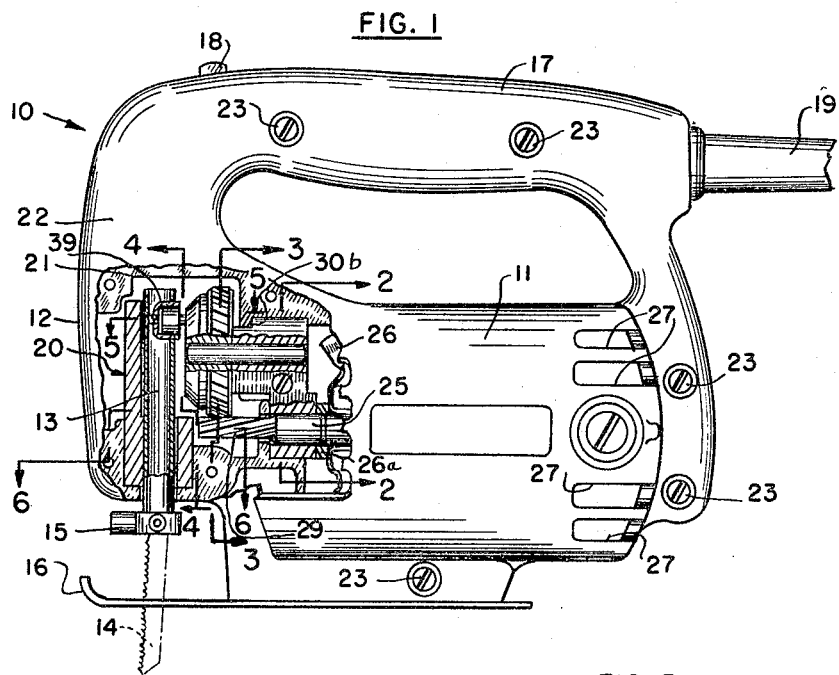
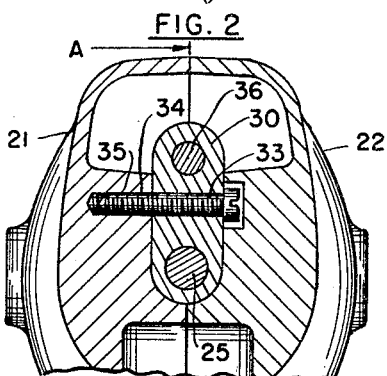
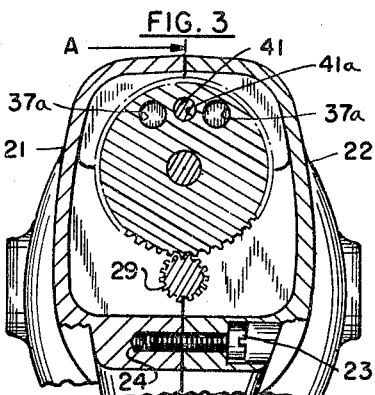
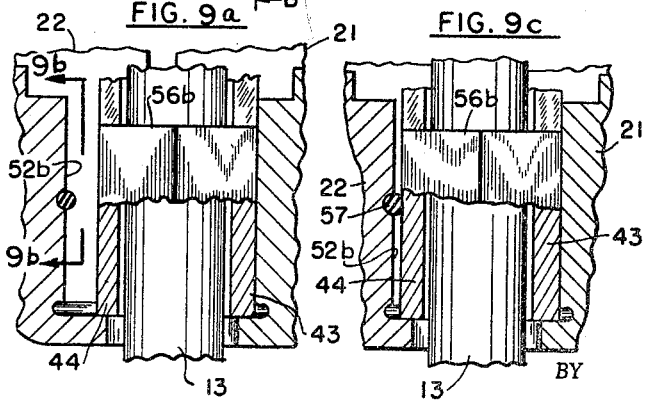
INVENTORS
SAMUEL H. KOHLER
ALLEN C. STANLEY
BY 
ATTORNEY Feb. 23, 1965 S. H. KOHLER ETAL 3,170,496
POWER-OPERATED RECIPROCATING TOOL WITH INTEGRAL BEARING BLOCK
Filed Oct. 2, 1962 3 Sheets-Sheet 2

INVENTORS
SAMUEL H. KOHLER
ALLEN C. STANLEY

BY Leonard Bloom
ATTORNEY

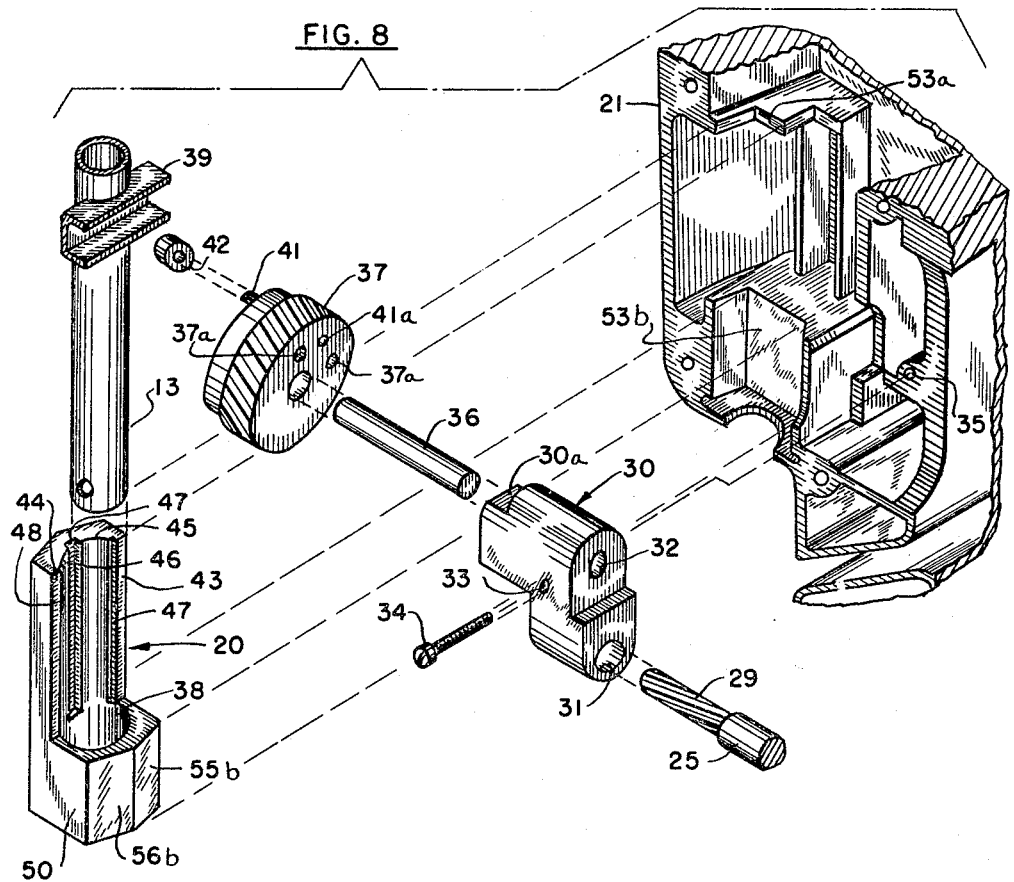
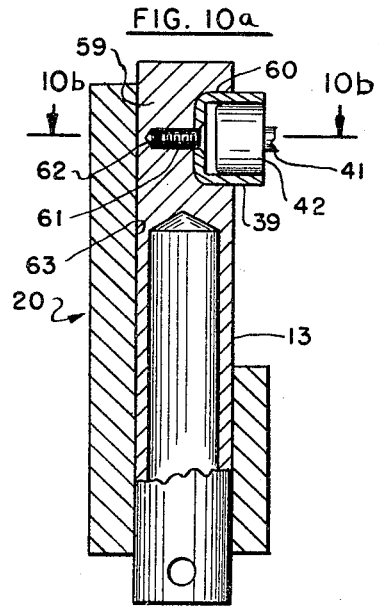
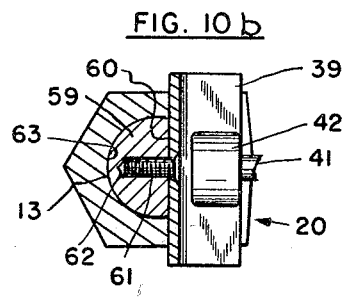
INVENTORS
SAMUEL H. KOHLER
ALLEN C. STANLEY
BY Leonard Bloom
ATTORNEY United States Patent Office 3,170,496
Patented Feb. 23, 1965

3,170,496
POWER-OPERATED RECIPROCATING TOOL WITH INTEGRAL BEARING BLOCK
Samuel H. Kohler, Lutherville, and Allen C. Stanley, Baltimore, Md., assignors to Black and Decker Manufacturing Company, Towson, Md., a corporation of Maryland
Filed Oct. 2, 1962, Ser. No. 227,950
10 Claims. (Cl. 143—68)

The present invention relates to an integral bearing block for a reciprocating assembly used in a power-operated device, and more particularly, to a one-piece bearing block which journals a reciprocating shaft in the housing, yet simultaneously supports the shaft assembly from the twisting about its axis.

It is an object of the present invention to provide, in a portable power-driven tool of the type having a split-housing including a pair of complementary mating halves, a bearing block having a bore formed therein for journaling a reciprocating shaft, wherein the bearing block is trapped or otherwise retained between the complementary mating halves as the halves are secured together; and wherein the bearing block has a pair of integrally formed co-planar guideways extending beyond the bore, and one on each side of the reciprocating shaft, such that a transverse yoke, which is carried by the reciprocating shaft, rides upon the co-planar guideways as the shaft is reciprocated.

It is another object of the present invention to provide, in a portable power-driven tool, a bearing block for journaling a reciprocating shaft, wherein means are provided to prevent the reciprocating shaft from substantial movement about its axis and with respect to the bearing block; and wherein means are further provided to prevent the bearing block itself from movement with respect to the housing for the tool.

It is yet another object of the present invention to provide, in a portable power-driven tool having a motor shaft, a bearing block for journaling a reciprocating shaft, in combination with an intermediate bearing block disposed between the reciprocating shaft and the motor shaft, wherein the intermediate bearing block has a pair of parallel spaced-apart bores formed therein for journaling the motor shaft and a stub shaft, respectively; and wherein motion-translating means are provided between the reciprocating shaft and a gear carried by the stub shaft.

It is yet still another object of the present invention to provide, in a portable power-driven tool of the type having a split-housing including a pair of complementary mating halves, a bearing block trapped between the mating halves of the split-housing, wherein at least one longitudinal ridge is integrally formed within one of the mating halves; and wherein the longitudinal ridge will be pinched against the bearing block and will be deformed, as the halves are secured together, thereby trapping and retaining the bearing block between the complementary mating halves of the split-housing.

It is a further object of the present invention to provide, in a portable power-driven tool, bearing means having a bore formed therein for journaling a reciprocating shaft, the shaft having a circular cross-section and carrying a transverse yoke, wherein the bearing means has a pair of co-planar guideways, one on each side of the reciprocating shaft, such that the transverse yoke rides on the co-planar guideways as the reciprocating shaft is reciprocated; and wherein the bearing means further has a second pair of guideways, one each alongside of a respective one of the co-planar guideways, and each of the second pair of guideways being coterminous with the bore in the bearing means, that it, formed in cross-section along an arc whose radius is substantially equal to that of the circular cross-section of the reciprocating shaft, such that the second pair of guideways further support the reciprocating shaft.

In accordance with the teachings of the present invention, there is illustrated and described herein a preferred embodiment in which a portable power-driven tool, such as a portable electric jig saw, is provided with a split-housing including a pair of complementary mating halves, one of which constitutes the cover for the other. Means are provided to secure the halves together along a common longitudinal midplane. A motor is provided which has a motor shaft whose axis of rotation is substantially within the common longitudinal midplane. A bearing block is disposed forwardly of the motor shaft and is trapped between the complementary mating halves of the split-housing as the halves are secured together. The bearing block has a bore formed therein along an axis which is within the common longitudinal midplane, and preferably, substantially transverse to the axis of the motor shaft. A reciprocating shaft is journaled in the bore of the bearing block. An intermediate bearing block is disposed between the reciprocating shaft and the motor. The intermediate bearing block has a pair of parallel spaced-apart bores formed therein, including a first bore and a second bore, having respective axes which are substantially within the common longitudinal midplane, and which are parallel to the axis of rotation of the motor shaft. The motor shaft is journaled in the first bore of the intermediate bearing block, and a pinion is formed on the end of the motor shaft. A stub shaft is journaled in the second bore of the intermediate bearing block, and a gear is carried by the stub shaft and meshes with the pinion. Motion-translating means are provided between the gear and the reciprocating shaft. This motion-translating means comprises an eccentric pin carried by the gear and guided within a transverse yoke, the yoke being secured to the reciprocating shaft. The bearing block has a pair of co-planar guideways integrally formed therewith and extending beyond the bore formed therein for journaling the reciprocating shaft. The co-planar guideways are in a plane which is substantially transverse to the common longitudinal midplane of the tool, as well as being parallel to the axis of the bore; and one each of the co-planar guideways is located on a respective side of the reciprocating shaft. The transverse yoke, which is carried by the reciprocating shaft, rides upon the pair of co-planar guideways as the reciprocating shaft is reciprocated. Consequently, the reciprocating shaft is held against substantial movement about its own axis and with respect to the bearing block. Moreover, and preferably, the bearing block is formed with at least one pair of external flats, radially of the bore in the bearing block, with the result that the bearing block is itself held against movement with respect to the split-housing for the tool.

These and other objects of the present invention will become apparent with a reading of the following specification, taken in conjunction with the enclosed drawings, in which:

FIGURE 1 is a side elevational view of a typical power-driven tool embodying the teachings of the present invention, with parts being broken away and sectioned to illustrate its design and construction;

FIGURE 2 is a transverse section taken along the lines 2—2 of FIGURE 1, looking rearwardly of the tool, and showing the intermediate bearing block retained between the mating halves of the split-housing;

FIGURE 3 is a transverse section taken along the lines 3—3 of FIGURE 1, looking rearwardly of the tool, and showing the gear that is carried by the stub shaft for engagement with the pinion formed on the motor shaft;

Figure 7A:
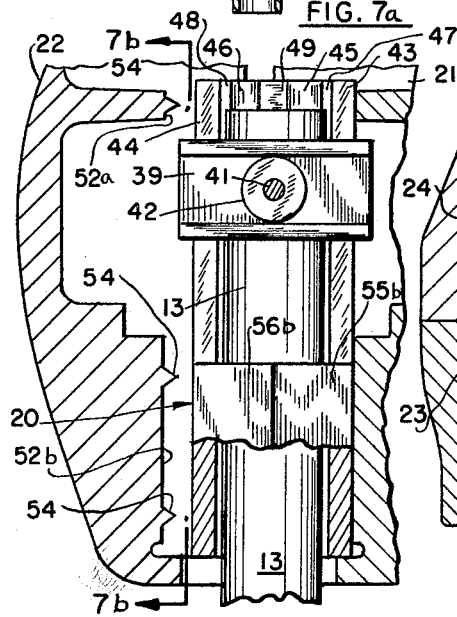
FIGURE 7a is a view corresponding to a portion of FIGURE 4, but enlarged over the scale of FIGURE 4, and with the top half of the split-housing shown in exploded relationship to the bottom half of the split-housing and to the bearing block to be trapped therebetween.

FIGURE 8 is an exploded perspective view, showing the motor shaft having the pinion formed thereon, the intermediate bearing block having a first bore for journaling the motor shaft, the second bore formed in the intermediate bearing block for journaling the stub shaft, the gear carried by the stub shaft, the eccentric pin carried by the gear, the roller on the eccentric pin, the transverse yoke carried by the reciprocating shaft, the bearing block for journaling the reciprocating shaft and for simultaneously guiding the transverse yoke, and a portion of the bottom half of the split-housing within which the bearing block is trapped;

FIGURE 9a is a view corresponding to a portion of FIGURE 7a, but showing a modified construction which utilizes a plurality of cylindrical rubber plugs in lieu of the longitudinal ridges;

FIGURE 9b is a partial elevational view taken along the lines 9b—9b of FIGURE 9a, showing the cylindrical configuration of one of the rubber plugs;

FIGURE 9c corresponds to FIGURE 9a, but shows how the rubber plugs will be compressed when the mating halves are secured together;

FIGURE 10a is a second modification, wherein the transverse yoke is secured to the reciprocating shaft in another manner, and wherein the bearing block is changed accordingly for increased supplementary support of the reciprocating shaft; and FIGURE 10b is a section view taken along the lines 10b—10b of FIGURE 10a.

With reference to FIGURE 1, there is illustrated a portable electric jig saw 10, although it will be appreciated that the teachings and essence of the present invention are equally appreciable to a wide variety of portable power-driven tools, appliances, and other devices. With this in mind, the portable electric jig saw 10 comprises a motor housing 11, a gear case 12 forwardly of the motor housing 11, a reciprocating shaft 13, a saw blade 14 secured thereto by means of a clamp 15, a supporting shoe 16 by means of which the saw 10 may be guided along the top surface of a suitable workpiece, and an overhead handle 17 which includes an electric switch 18 and a conventional line cord 19, the latter being broken for ease of illustration.

Figure 6:
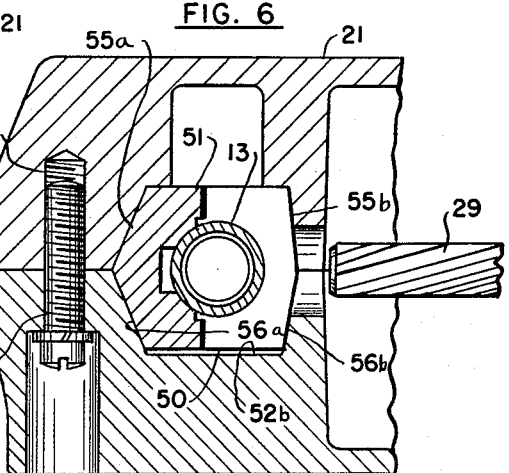
FIGURE 6 is a view taken along the lines 6—6 of FIGURE 1, enlarged over the scale of FIGURE 1, and showing the means for trapping the bearing block between the complementary mating halves of the split-housing.

With reference to FIGURES 1, 4, 6, and 8, a bearing block 20 is provided for journaling the reciprocating shaft 12. The bearing block 20 is trapped between the mating halves 21 and 22 of the split-housing as these halves are secured together. The mating half 21 may be referred to as the "bottom" half, while the other mating half 22 may be referred to as the "top" half or cover. In the assembly of the jig saw 10, the various components of the jig saw are assembled within the bottom half 21, and then the top half 22 is secured to the bottom half 21 by means of a plurality of screws 23, which, as shown in FIGURE 6, are received within corresponding tapped holes 24 formed in the bottom half 21. The complementary mating halves 21 and 22 are thus detachably secured together along a common longitudinal midplane, which is designated by the line AB in FIGURE 2, and which may be referred to as the "parting line" between the mating halves 21 and 22; moreover, the split-housing may itself be referred to occasionally as a "clam shell" type of housing. The motor housing 11 houses an electric motor, which (being conventional) is herein omitted for ease of illustration. The motor includes a motor shaft (or armature shaft) 25, and a fan 26 and fan washer 26a are mounted upon the motor shaft 25. The fan 26 draws cooling air through the motor housing 11 from the rearward air ventilating slots 27, and the cooling air is discharged forwardly (and radially) of the fan 26 by means of a series of openings, which are herein omitted for ease of illustration. The motor shaft 25 projects through an opening formed in a wall 28 formed between the motor housing 11 and the gear case 12. The motor shaft 25 protrudes within the gear case 12, and a pinion 29 is formed on the end of the motor shaft 25. Preferably, but not necessarily, the pinion 29 is of a helical design, as shown, and is formed integrally with the motor shaft 25.

Figure 4:
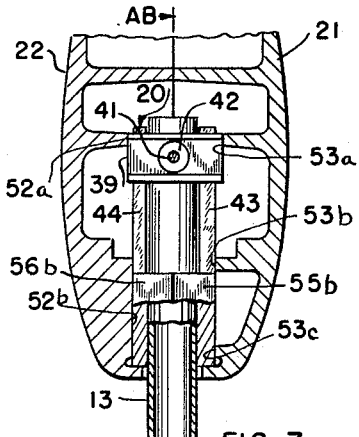
FIGURE 4 is a transverse section taken along the lines 4—4 of FIGURE 1, looking forwardly of the tool, and showing the channel-shaped transverse yoke which is secured to the reciprocating shaft, the latter being journaled in a bore formed in the bearing block.
Figure 5:
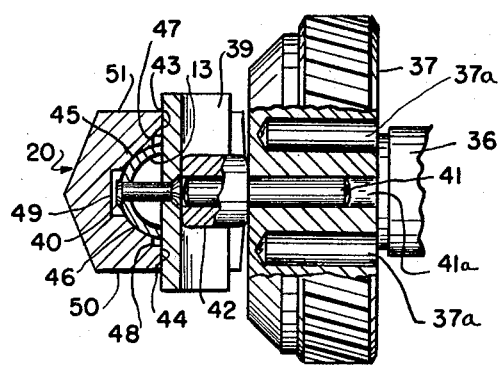
FIGURE 5 is a view taken along the lines 5—5 of FIGURE 1, showing the eccentric pin and roller guided within the transverse yoke, and further showing the reciprocating shaft journaled and supported in the bearing block, the transverse yoke riding upon the pair of coplanar guideways formed integrally with the bearing block.

With reference again to FIGURES 1 and 8, and with reference to FIGURES 2, 3, and 5, an intermediate bearing block 30 is disposed between the reciprocating shaft 13 and the electric motor. Preferably, the intermediate bearing block 30 has a cut-out portion 30a which engages a complementarily formed portion 30b of the housing, thereby assisting in retaining and securing the intermediate bearing block 30 in the split-housing. A first bore 31 and a second bore 32 are formed in the intermediate bearing block 30. The bores 31 and 32 are parallel to each other and are spaced-apart from each other; and the bores 31, 32 have respective axes which are substantially within the common longitudinal mid-plane AB, and which are parallel to the axis of rotation of the motor shaft 25. A transverse hole 33 is formed in the intermediate bearing block 30 between the bores 31 and 32. A screw 34, see FIGURE 2, passes through the transverse hole 33 and engages within a tapped recess 35, thereby securing the intermediate bearing block to the bottom half 21 of the split-housing. Preferably, but not necessarily, the intermediate bearing block 30, as well as the bearing block 20, are formed from an oil-impregnated porous material, such as a bronze-iron composition that is sintered from a powder; however it will be appreciated that other methods for producing these bearing blocks, as well as various other materials, are within the scope of the present invention. Moreover, it will be further appreciated that the intermediate bearing block 30, like the bearing block 20, could also be trapped, if desired, between the mating halves 21, 22 of the split-housing for the tool 10. The motor shaft 25 is journaled within the first bore 31 of the intermediate bearing block 30, and a stub shaft 36 is journaled within the second bore 32 of the intermediate bearing block 30. A gear 37 is press-fitted upon the stub shaft 36 and is carried thereby for meshing engagement with the pinion 29. Also, the gear 37 is provided with a pair of blind holes 37a drilled therein (see FIGURES 3 and 5) for counterbalancing purposes in a manner understood by one skilled in the art.

With reference again to FIGURES 1, 4, 5, 6, and 8, a bore 38 is formed within the bearing block 20 so as to journal the reciprocating shaft 13. The bore 38 has an axis which is substantially within the common longitudinal midplane AB, and which is substantially transverse to the axis of rotation of the motor shaft 25. A transverse yoke 39, which may be channel-shaped, is secured to the shaft 13 by means of a rivet 40; and preferably, the subassembly of the transverse yoke 39, rivet 40 and reciprocating shaft 13 are dip-brazed and simultaneously cyanide-hardened. An eccentric pin 41 is journaled within an eccentric bore 41a formed within the gear 37; a roller 42 is loosely carried by the eccentric pin 41, and the roller 42 is guided within the track formed by the transverse yoke 39. This is the conventional "Scotch-yoke" type of motion-translation mechanism that is used to convert the rotation of the motor shaft 25 into the reciprocation of the shaft 13.

Moreover, a pair of co-planar guideways 43 and 44 are integrally formed within the bearing block 20, which (see FIGURE 1) is substantially L-shaped in side elevation. The co-planar guideways 43 and 44 (see FIGURE 5) extend beyond the bore 38 formed in the bearing block 30; and the co-planar guideways 43 and 44 are parallel to the axis of the bore 38, with one each of the guideways 43, 44 being on a respective side of the reciprocating shaft 13. Consequently, the back of the channel-shaped transverse yoke 39, which is carried by the reciprocating shaft 13, will be guided upon or will slide upon the guideways 43 and 44 as the reciprocating shaft 13 is reciprocated. Preferably, the reciprocating shaft 13 is circular in cross-section and is tubular (as shown) for decreased weight. A pair of second guideways 45 and 46 are also formed within the bearing block 20. One each of these second guideways 45, 46 are alongside of a respective one of the pair of co-planar guideways 43 and 44, and respective longitudinal ledges 47 and 48 are formed therebetween. The longitudinal ledges 47, 48 serve the purpose of clearance cut-outs, should any of the dip-brazing material adhere to the back of the yoke 39 adjacent to the reciprocating shaft 13. The second pair of guideways 45, 46 are coterminous with the bore 38 formed in the bearing block 20; and like the co-planar guideways 43 and 44, the second guideways 45, 46 extend beyond the bore 38. Moreover, each of the second pair of guideways 45, 46 are formed in cross-section along an arc whose radius is substantially equal to that of the circular cross-section of the reciprocating shaft 13.

Accordingly, it will be appreciated that as the reciprocating shaft 13 is reciprocated by means of the aforesaid motion-translating mechanism, the reciprocating shaft 13 will be journaled primarily within the bore 38 and will be further supported (in a supplementary manner) upon the second guideways 45, 46. At the same time, the transverse yoke 39, which is carried by the reciprocating shaft 13, will be supported upon and will ride upon the co-planar guideways 43, 44 as the shaft 13 is reciprocated. Consequently, the reciprocating shaft 13 is fully journaled and supported; moreover, and by reason of the transverse yoke 39 riding upon the co-planar guideways 43 and 44, the reciprocating shaft 13 is simultaneously prevented from substantial movement, such as twisting, about its own axis and with respect to the bearing block 20.

With reference again to FIGURE 5, a longitudinal cut-out 49 is provided within the bearing block 20, intermediate the second pair of guideways 45 and 46, so as to provide a clearance slot for the head of the rivet 40.

Figure 7C:
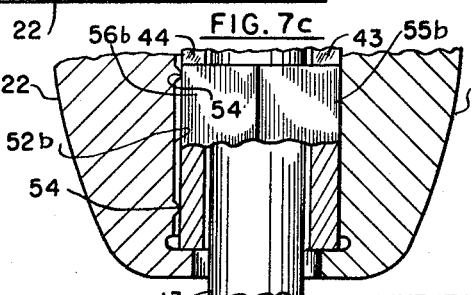
FIGURE 7c is a view corresponding substantially to a portion of FIGURE 7a, but showing how the longitudinal ridges will be pinched against the bearing block after the mating halves are secured together.
Figure 7B:
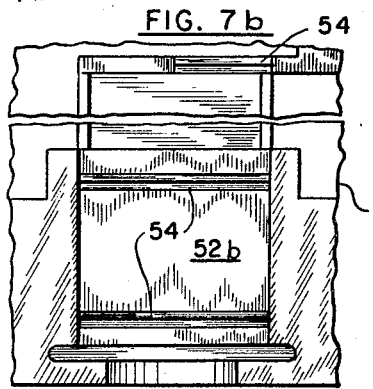
FIGURE 7b is a partial elevational view taken along the lines 7b—7b of FIGURE 7a showing the longitudinal ridges which are formed in the top or cover half of the split-housing so as to trap the bearing block as the complementary mating halves of the split-housing are secured together.

With reference again to FIGURES 4, 6, and 8, and with further reference to FIGURES 7a, 7b, and 7c, the bearing block 20 is provided with a pair of parallel flat sides 50 and 51, each of which lies within a respective plane that is substantially parallel to the common longitudinal midplane AB between the complementary mating halves 21 and 22. Consequently, means are provided to prevent the bearing block 20 from movement about the axis of the bore 38 formed therein and with respect to the split-housing 21 and 22, thereby further enhancing the stability of the reciprocating shaft 13 and the saw blade 14 which is secured thereto. Moreover, a pair of lands 52a and 52b are formed in the top half or cover 22, while a corresponding plurality of lands 53a, 53b, and 53c are formed in the bottom half 21. A plurality of longitudinal ridges 54 are formed in the respective lands 52a and 52b of the mating half or top half 22. In an actual embodiment of the present invention, the longitudinal ridges 54 extend approximately 1/64 or 1/32 of an inch beyond their respective lands 52a, 52b; however, in the enclosed drawings, the ridges 54 have been exaggerated slightly for clarity of understanding. As shown more particularly in FIGURES 7a and 7c, the longitudinal ridges 54 will be pinched against the bearing block 20 as the mating halves 21 and 22 are secured together, thus trapping or retaining the bearing block 20 within the split-housing. The longitudinal ridges 54 are formed integrally within the top half 22, which preferably is formed from a suitable material, such as die-cast aluminum. Consequently, the longitudinal ridges 54 are deformed slightly when pinched against the bearing block 20. More specifically, and as shown in FIGURE 7c, each longitudinal ridge 54 may have its apex rounded off slightly as the mating halves 21 and 22 are secured together. Under certain circumstances, the ridges 54 may create a very slight impression in the portions of the bearing block 20 that are engaged thereby, depending upon the respective dimensions and the relative hardness of the materials chosen. The longitudinal ridges 54 serve the function of trapping the bearing block 20 within the split-housing and simultaneously taking up the tolerances between the bearing block 20 and the mating halves 21, 22 of the split-housing, thereby allowing a precision product, one that is durable and reliable, to be manufactured at a relatively-low unit cost.

Moreover, the bearing block 20 (radially of its bore 38) is provided with a pair of tapered sides 55a and 55b for matching engagement with correspondingly-tapered recesses formed integrally within the bottom half 21; and the bearing block 20 is further provided with a second pair of tapered sides 56a and 56b for matching engagement with correspondingly-tapered recesses formed integrally with in the top half 22, thereby assisting in the location and trapping of the bearing block 20.

With references to FIGURES 9a, 9b, and 9c, a modification of the present invention is shown wherein the longitudinal ridges 54 have been eliminated and have been substituted for by a plurality of rubber plugs 57. Preferably, a pair of rubber plugs 57 are utilized, one of which is located within the land 52a, and the other of which is located within the land 52b (as shown); however, only one of the rubber plugs 57 has been shown herein for convenience of illustration. The rubber plugs 57 are received within corresponding semi-cylindrical recesses 58 formed within the top half 22; consequently, and as shown more particularly in FIGURE 9c, the rubber plugs 57 are compressed against the bearing block 20 as the mating halves 21 and 22 are detachably secured together, thereby assisting in the location and trapping of the bearing block 20.

With reference to FIGURES 10a and 10b, another modification is shown wherein the transverse yoke 39 is secured to the reciprocating shaft 13 in a manner other than utilizing the rivet 40. In this instance, the reciprocating shaft 13 is still tubular throughout most of its length, preferably, but has a solid top portion 59 having a slot 60 formed therein to receive the transverse yoke 39. The yoke 39 is secured to the shaft 13 by means of a flat head screw 61 which engages a suitable tapped hole 62 formed in the top portion 59 of the reciprocating shaft 13. Consequently, the longitudinal cut-out 49 may be eliminated, as well as the longitudinal ledges 47, 48; and the second pair of guideways 45, 46 may be merged into one continuous (substantially semicylindrical) guideway 63 for increased (supplementary) support of the reciprocating shaft 13.

The advantages and features of the present invention may be summarized as follows: (1) the bearing block 20, which is substantially L-shaped in longitudinal section, serves the dual function of both journaling the reciprocating shaft 13 and simultaneously supporting the yoke 39; (2) inasmuch as the bearing block 20 is all one piece, that is, the co-planar guideways 43, 44 are integrally formed with the block 20 which has the bore 38 formed therein, it is not necessary to resort to the prior art practice of machining a separate bearing boss and separate ways in the castings to close tolerances, but rather, the bearing block 20 (being integral) may be mounted in the tool 10 independent of any tolerances in the castings 21, 22 of the tool; (3) the bearing block 20 is trapped between the mating halves 21, 22 of the split-housing, as the halves are secured together, and any tolerances between the bearing block 20 and the halves 21, 22 are taken up by the longitudinal ridges 54 (or rubber plugs 57) in the cover half 22 of the split-housing; (4) the yoke 39 is fully supported on the co-planar guideways 43, 44, and hence the yoke 39 (together with the reciprocating shaft 13 and blade 14) are prevented from substantial movement, such as twisting, about the axis of the bore 38 in the bearing block 20; (5) the bearing block 20, being formed with at least one pair of external flats 50, 51, is prevented from movement with respect to the mating halves 21, 22 of the split-housing for the tool 10; (6) both of the bearing blocks 20 and 30 may be formed by a sintering process, using a powder having a suitable bronze-iron composition, so as to result, ultimately, in oil-impregnated porous bearings that are precision components at relatively-low unit cost; (7) the combination of the L-shaped bearing block 20 and the intermediate bearing block 30, the latter having a pair of parallel spaced-apart bores formed therein, results in a tool (such as the portable electric jig saw 10) that is compact, durable, and easy to handle; and (8) the overall combination of structure, in the jig saw 10, allows the unit to be manufactured quickly and easily without expensive machining so as to result in a reliable high-performance unit at a substantially lower unit cost.

Obviously, many modifications may be made without departing from the basic spirit of the present invention; and accordingly, within the scope of the appended claims, the invention may be practiced other than has been specifically described.

We claim:

1. In a power-operated reciprocating tool of the type comprising a split housing including a pair of complementary mating portions detachably secured together, and further comprising a reciprocating assembly including a reciprocating shaft with a yoke secured thereto, and a tool element carried by the reciprocating shaft beyond the housing, the improvement in journaling the reciprocating shaft in the housing and simultaneously supporting the reciprocating assembly from twisting about the axis of reciprocation which comprises:
    (a) a one-piece bearing block and means to retain said block between the mating portions of the split housing, and to prevent said block from twisting about the axis of reciprocation;
    (b) said block comprising a body portion formed with a bore for journaling the reciprocating shaft; and
    (c) said block further comprising a guideway formed integrally with said body portion and extending therefrom parallel to the axis of reciprocation;
    (d) whereby the yoke is slidably supported on said guideway, and whereby the reciprocating assembly is prevented from twisting about the axis of reciprocation.

2. In a power-operated reciprocating tool of the type comprising a split housing including a pair of complementary mating portions detachably secured together and further comprising a reciprocating assembly having a reciprocating shaft and a transverse yoke secured thereto, the yoke having respective ends projecting laterally of the shaft, and a tool element carried by the reciprocating shaft beyond the housing, the improvement in means to journal the reciprocating in the reciprocating housing and simultaneously to support the shaft assembly from twisting about the axis of reciprocation which comprises:
    (a) a one-piece bearing block and means to retain said block between the mating portions of the split housing and to prevent said block from twisting about the axis of reciprocation;
    (b) said block comprising a body portion formed with a bore for journaling the reciprocating shaft; and
    (c) said block further comprising a pair of coplanar guideways formed integrally with said body portion and extending therefrom parallel to the axis of reciprocation;
    (d) said co-planar guideways extending one each on a respective side of the reciprocating shaft, whereby the respective ends of the transverse yoke are slidably supported on said guideways, and whereby the reciprocating assembly is prevented from twisting about the axis of reciprocation.

3. The improvement in claim 2, wherein:
    (a) the reciprocating shaft has a circular cross-section; and wherein:
    (b) said bearing block has a second pair of guideways, one each adjacent to said co-planar guideways;
    (c) each of said second pair of guideways being formed as part of a cylindrical surface coincident with said bore in said bearing block body, thereby further supporting the reciprocating shaft.

4. In a power-operated reciprocating tool of the type comprising a housing and a reciprocating assembly in the housing including separable housing members, the assembly including a reciprocating shaft and a yoke secured to the shaft, the yoke having a back portion and a front portion including a track for an eccentric, and a tool element carried by the reciprocating shaft beyond the housing, the improvement in means to journal the reciprocating shaft in the housing and simultaneously to support the reciprocating assembly from twisting about the axis of reciprocation which comprises:
    (a) a one-piece substantially L-shaped bearing block retained between said separable housing members against substantial twisting about the axis of reciprocation;
    (b) said block comprising a body portion formed with a bore for journaling the reciprocating shaft;
    (c) said block further comprising a first guideway formed integrally with said body portion and extending therefrom parallel to the axis of reciprocation;
    (d) said first guideway having a cross-sectional shape conforming to that of the back portion of the yoke, whereby the yoke avoids any bearing contact with said separable housing members, and whereby the back of the yoke is instead slidably supported on said first guideway of said bearing block whereby the reciprocating assembly is thereby prevented from substantial twisting about the axis of reciprocation; and
    (e) a second guideway formed integrally with said body and extending therefrom parallel to the axis of reciprocation adjacent said first guideway;

(f) said second guideway having a cross-sectional shape conforming to that of the reciprocating shaft itself, whereby the shaft is slidably supported on said second guideway in addition to being journaled in said bore.

5. In a power-operated reciprocating tool of the type comprising a housing and a reciprocating assembly in the housing including separable housing members, the assembly including a reciprocating shaft and a yoke secured to the shaft, the yoke having a back portion and a front portion including a track for an eccentric, and a tool element carried by the reciprocating shaft beyond the housing, the improvement in means to journal the reciprocating shaft in the housing and simultaneously to support the reciprocating assembly from twisting about the axis of reciprocation, which comprises:
   (a) a sintered oil-impregnated substantially L-shaped bearing block retained between said separable housing members against substantial twisting about the axis of reciprocation;
   (b) said bearing block comprising a body portion with a bore formed therein for journaling the reciprocating shaft; and
   (c) said bearing block further comprising a pair of co-planar guideways formed integrally with said body portion and extending therefrom parallel to the axis of reciprocation;
   (d) whereby the yoke avoids any bearing contact with said separable housing members, and whereby the respective ends of the yoke are instead slidably supported on said co-planar guideways of said bearing block, and whereby the shaft assembly is thereby prevented from substantial twisting about the axis of reciprocation.

6. In a portable electric jig saw, the combination of:
   (a) a housing comprising separable housing members detachably secured together;
   (b) a reciprocating assembly in said housing; said assembly comprising:
      (1) a reciprocating shaft; and
      (2) a yoke secured to said shaft;
   (c) a saw blade secured to said shaft beyond said housing;
   (d) a bearing block having a bore for journaling said reciprocating shaft;
   (e) means to dispose said block between said separable housing members and retain said block from substantial twisting about the axis of reciprocation; and
   (f) said block further having an integral guideway formed therein parallel to the axis of reciprocation;
   (g) whereby said yoke avoids any bearing contact with either of said housing members and is instead slidably supported on said guideway of said bearing block, and whereby said yoke is thereby precluded from substantial twisting about the axis of reciprocation.

7. The combination of claim 6, wherein said bearing block comprises:
   (a) a sintered oil-impregnated substantially L-shaped bearing member.

8. The combination of claim 6, wherein:
   (a) said housing comprises a pair of complementary mating halves detachably secured together along a common longitudinal midplane; and wherein
   (b) said bearing block is trapped between said mating halves;
   (c) said block having flat surfaces formed thereon for engaging complementary recesses in the mating halves of the split housing, thereby preventing said block from twisting about the axis of reciprocation.

9. The combination of claim 6, wherein said integral guideway in said bearing block comprises:
   (a) a planar guideway; and wherein:
   (b) the back of said yoke is slidably supported on said planar guideway.

10. The combination of claim 6, wherein said integral guideway in said bearing block comprises:
   (a) a pair of co-planar guideways, one on each side of said reciprocating shaft;
   (b) whereby the respective ends of the back of said yoke are slidably supported on said co-planar guideways.

References Cited by the Examiner
UNITED STATES PATENTS

| | | | |
|---|---|---|---|
| 2,606,947 | 8/52 | Happe | 308—184 |
| 2,665,960 | 1/54 | Caisley. | |
| 2,902,067 | 9/59 | Oakley | 143—68.6 |
| 2,931,926 | 4/60 | De Angelis et al. | 310—90 |
| 2,988,924 | 6/61 | Cooley | 74—50 |
| 3,031,990 | 5/62 | Broedner. | |

ANDREW R. JUHASZ, *Primary Examiner.*

DONALD R. SCHRAN, WILLIAM W. DYER, JR.,
*Examiners.*